(12) United States Patent
Chen et al.

(10) Patent No.: US 6,900,932 B2
(45) Date of Patent: May 31, 2005

(54) OPTICAL GAIN FLATTENING FILTER USING VPG-BASED OPTICAL ELEMENTS

(75) Inventors: Li Chen, Fremont, CA (US); William Yang, Fremont, CA (US); Charlie Zhang, Fremont, CA (US); Danny Yu, Fremont, CA (US)

(73) Assignee: BaySpec, Inc., Fremont, CA (US)

( * ) Notice: Subject to any disclaimer, the term of this patent is extended or adjusted under 35 U.S.C. 154(b) by 303 days.

(21) Appl. No.: 10/245,458

(22) Filed: Sep. 16, 2002

(65) Prior Publication Data

US 2003/0053195 A1 Mar. 20, 2003

Related U.S. Application Data

(60) Provisional application No. 60/323,885, filed on Sep. 20, 2001.

(51) Int. Cl.[7] .............................. H01S 3/00; G02B 27/44
(52) U.S. Cl. ..................................... 359/337.1; 359/566
(58) Field of Search .............................. 359/337.2, 516

(56) References Cited

U.S. PATENT DOCUMENTS

| | | | | |
|---|---|---|---|---|
| 6,205,273 B1 | * | 3/2001 | Chen ............................ | 385/37 |
| 6,377,390 B1 | * | 4/2002 | Mizuno et al. .......... | 359/337.1 |
| 6,496,303 B1 | * | 12/2002 | Fleming ................... | 359/337.1 |
| 6,611,371 B2 | * | 8/2003 | Wigley et al. ............ | 359/337.2 |
| 6,687,431 B2 | * | 2/2004 | Chen et al. ................... | 385/24 |
| 6,738,183 B2 | * | 5/2004 | Shigehara ................. | 359/337.2 |
| 6,744,941 B2 | * | 6/2004 | Khalfallah et al. ........... | 385/14 |
| 6,747,791 B1 | * | 6/2004 | Yang et al. .............. | 359/337.1 |
| 6,750,995 B2 | * | 6/2004 | Dickson ....................... | 359/15 |
| 2002/0109907 A1 | * | 8/2002 | Chen et al. ................. | 359/337 |
| 2003/0053750 A1 | * | 3/2003 | Yang et al. .................... | 385/27 |
| 2003/0118281 A1 | * | 6/2003 | Chen et al. .................... | 385/24 |
| 2003/0123791 A1 | * | 7/2003 | Yu et al. ....................... | 385/24 |

OTHER PUBLICATIONS

Yu et al. Volume phase grating based flat–top passband response dense wavelength division multiplexers. OFCC 2003. Mar. 23–28, 2003. vol. 1. pp. 255–257.*

* cited by examiner

Primary Examiner—Thomas H. Tarcza
Assistant Examiner—Deandra M. Hughes
(74) Attorney, Agent, or Firm—Justin F. Boyce; Dechert LLP

(57) ABSTRACT

An optical gain flattening filter for attenuating the wavelength power levels of an optical beam to a threshold value. The filter has a series of volume phase gratings which each have a loss spectrum. The sum of the loss spectra for the volume phase gratings is about equal to the opposite of the gain spectrum of the optical amplifier. As the optical beam passes through the volume phase gratings, the sum of the loss spectra is added to the gain spectrum of the optical amplifier such that the optical beam is attenuated to the threshold value.

35 Claims, 6 Drawing Sheets

OPTICAL GAIN FLATTENING FILTER USING VPG-BASED OPTICAL ELEMENTS

CROSS REFERENCE TO RELATED APPLICATIONS

The present application claims priority to U.S. Provisional Patent Application No. 60/323,885 filed Sep. 20, 2001, the contents of which are incorporated herein by reference.

BACKGROUND OF THE INVENTION

The present invention generally relates to methods and apparatus for flattening the gain spectra of optical amplifiers in dense wavelength division multiplexing (DWDM) communications systems, and more particularly, for flattening the spectral profile of the gain of erbium-doped fiber amplifiers (EDFAs).

High-speed fiber-optic communications networks are becoming increasingly popular for data transmission due to their high transmission bit-rate and high information carrying capabilities. The explosive growth of telecommunication and computer communications, especially in the area of Internet, has placed a rapidly expanding demand on national and international communications networks. This tremendous amount of worldwide data traffic volume requires fiber-optic communications networks having multi-gigabit transmission capacity with highly efficient cross-connect links.

To this end, in the field of fiber-optic technology, products have been developed for multi-carrier transmission over a single fiber, which multiplies the amount of information capacity over a single carrier system. Several individual data signals of different wavelengths may be assembled into a composite multi-channel signal that is transmitted on a single fiber, commonly referred to as wavelength division multiplexing (WDM). Accordingly, with WDM, multiple users are able to share a common fiber-optic link which realizes high throughput. To assemble the multi-channel signals, a multiplexing device (MUX) is employed at the transmitting end, which combines the multiple light-wave signals from several sources or channels of different wavelengths into the single composite signal.

In order to avoid cross-talk between channels, the center wavelengths of the signals must be properly spaced and the pass bands must be well defined. For example, the well-accepted industrial standard is a channel spacing of 100 GHz (0.8 nm in 1.55 μm window) centered at the ITU grid with each signal channel having a pass bandwidth of 0.3 nm at 0.5 dB down power level. The multiplexed signal is then transmitted on a single fiber-optic communications link. At the receiving end, a demultiplexing device (DEMUX) separates the composite signal received from the fiber link into their original channel signals, each of which is a single signal channel centered at the ITU grid.

Dense wavelength division multiplying (DWDM) technology dramatically increases the information-carrying capacity transmitted on a single carrier fiber. For example, a 40-channel 100 GHz DWDM system with a 10 Gb/s transmission rate can transmit 400 Gb/s data in the C-band (1528–1563 nm). The number of channels deployed in long-haul DWDM systems is rapidly increasing to now beyond 100 over the C-band and L-band (1575–1610 nm). The MUX and DEMUX devices, in particular those with high-count channels, can be combined with other fiber-optic components to create new-generation products, thereby intensifying the networks' functionality.

An important issue in long-haul DWDM communications systems is related to the attenuation of signal power due to the presence of insertion, distribution, and transmission losses. The launched signals gradually decay as they propagate along the optical fibers. To boost the signal power, fiber amplifiers are employed periodically to compensate for the power loss. However, not all channels are amplified by the same factor because the gain spectrum (or gain profile) of an optical amplifier is not uniform. For example, as seen in FIG. 1, the gain spectrum of an EDFA has asymmetrical twin peaks due to a luminescent spectrum caused by the fine structure of the energy levels. Because the gain spectrum is not flat, there exists power deviation between amplified signals.

In long-haul transmission systems, optical signals are transmitted through a multi-amplifier system, such that differences between optical signal powers are accumulated. However, it is essential that channel powers of the multi-channel optical signal be approximately at the same level for optimal performance of DWDM systems. In other words, the system should have no spectral ripple across the bandwidth of whole channels. Accordingly, there is a need for a technique and device for flattening the gain spectrum of optical amplifiers to reduce the undesirable non-uniformity of channel powers.

Several prior-art techniques have been developed to statically flatten the gain spectrum of EDFAs across the bandwidth of 30–40 nm. This family of devices is known as fixed gain flattening filters (GFF). The basic idea behind these devices is to fabricate an optical filter whose transmission function (loss spectrum) versus wavelength is proportional to the inverse of the gain spectrum of the optical amplifier. When the signal amplified by an optical amplifier passes through such a filter, the power in the flat spectral regions will be reduced with respect to the lowest power level across the whole wavelength range so that the resulting power becomes uniform. In one approach, an optical notch filter is incorporated within the length of an erbium-doped fiber amplifier. Careful choice of the filter characteristics via multi-layer coating and location makes it possible to enhance the amplifier gain performance at wavelengths around 1550 nm. An amplifier with 27-dB gain and 33-nm bandwidth can be produced.

In another approach, a combination of long-period fiber Bragg gratings are used to produce an optical filter whose transmission spectrum counteracts the EDFA gain non-uniformities. The gain flattening is achieved across a bandwidth exceeding 40 nm. Other prior art filters, such as Mach-Zehnder filters and etalon-type filters are also employed for this purpose. Yet still another approach is to use a dual-core fiber to provide a relatively flat gain from 1525 to 1555 nm for EDFAs.

These gain flattening filters are truly static devices in the sense that their transmission spectrum functions are fixed once the fabrication is completed. From the application point of view, it is impractical to apply a fixed spectral profile to optical amplifiers with different gain profiles. This is to say that the fixed gain flattening filters will lead to a large residual non-uniformity of gain spectrum though they may work well for some particular optical amplifiers. Recently, a costly dynamic gain flattener has been developed to dynamically equalize the uneven spectral distribution resulting from optical amplification.

BRIEF SUMMARY OF THE INVENTION

The present invention provides a method for effectively constructing the desired transmission spectrum function (loss spectrum) of gain flattening filters. Furthermore, the present invention discloses an apparatus based on volume phase grating (VPG) optical elements, which not only precisely equalize the gain spectrum of an optical amplifier, but are also flexible when applied to different optical amplifiers. Thus, the gain flattening filters of the present invention are applicable to a broader class of optical amplifiers without loss of spectrum flatness.

The present invention provides a method and apparatus for statically flattening the gain spectrum of erbium-doped fiber amplifiers based on volume phase grating technology and for statically flattening the gain profile of other optical amplifiers, such as Raman amplifiers and semiconductor optical amplifiers. The present invention provides a passive device for equalizing channel power levels in fiber-optic networks so as to improve the optical performance of amplified DWDM signals.

In accordance with the present invention, a two-port passive optical gain-flattening filter is provided. Ideally, the filter has an input port, an output port, and a series of volume phase grating elements. The number N of VPGs is greater than or equal to 3. The input port is optically coupled to the first VPG. All of the VPGs are cascaded and the output port is optically coupled to the last VPG. Each VPG has a respective grating characteristic and is angularly oriented in a specific direction in space. The broadband light signal amplified by an optical amplifier or a series of optical amplifiers is inputted to the input port. The signal then passes through the N VPGs, each of which diffracts off a predetermined part of signal power over a given spectral region. The power to be reduced is controlled by adjusting the VPGs. The width and position of the diffraction spectrum of a given VPG can be tuned. After passing through all N VPGs, the transmitted signal spectrum is substantially flattened.

A considerable advantage over the prior art fixed gain flattening filters is that the transmission spectrum function can be adjusted to some extent by changing the relative orientation and angular positions between two adjacent VPGs. Accordingly, the device can be manually adjusted when used for a particular amplifier so that its transmission spectrum can finely counteract the gain profile of different optical amplifiers.

BRIEF DESCRIPTION OF THE DRAWINGS

These as well as other features of the present invention will become more apparent upon reference to the drawings wherein.

DETAILED DESCRIPTION OF THE INVENTION

Figure 1:
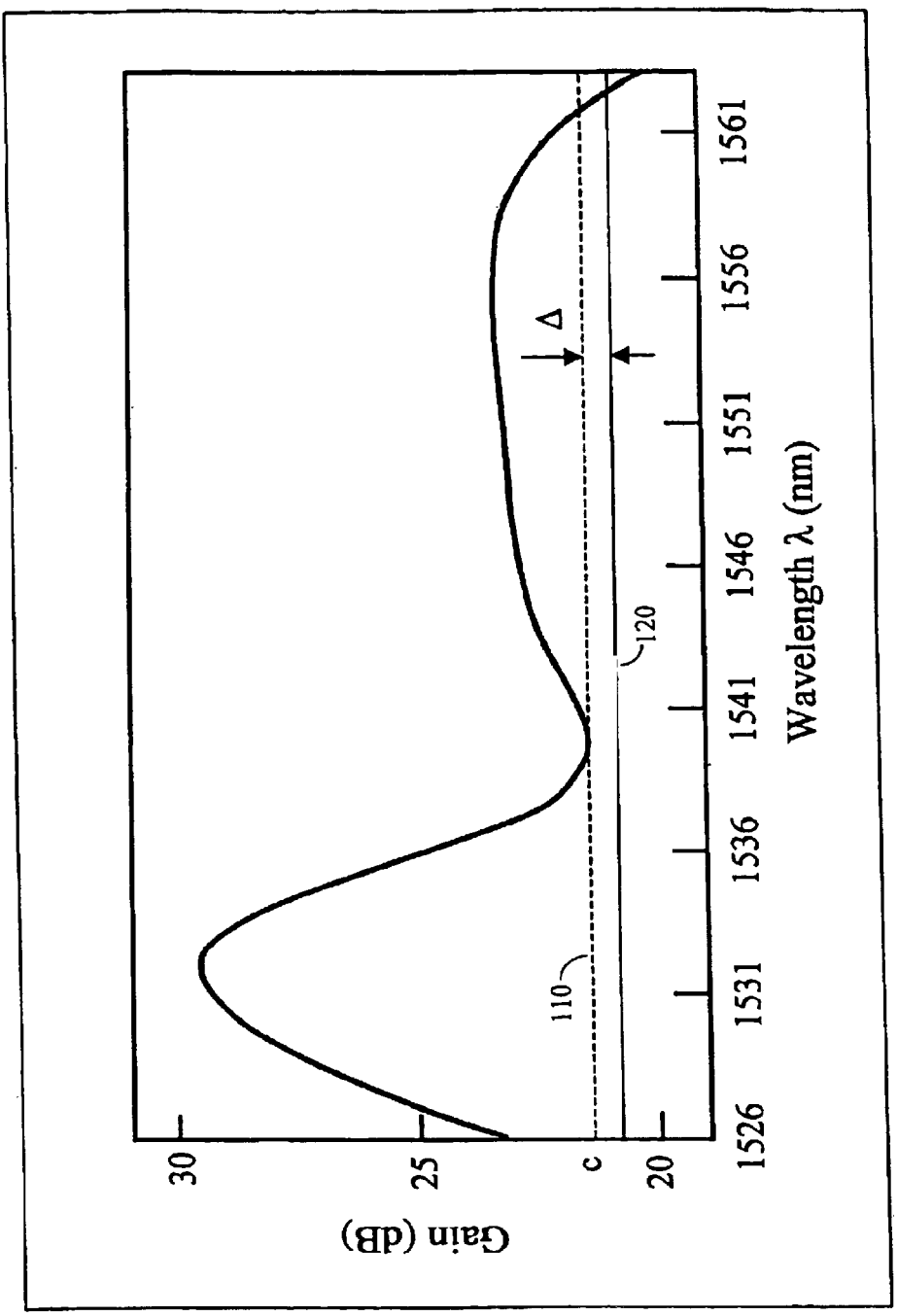
FIG. 1 is a gain spectrum of an optical beam from an erbium doped fiber amplifier.

Referring to the drawings wherein the showings are for purposes of illustrating a preferred embodiment of the present invention only, and not for purposes of limiting the same, FIG. 1 shows the typical gain spectrum of an optical beam generated by an erbium-doped fiber amplifier (EDFA). The EDFA is the most commonly used optical amplifier in fiber-optic communications networks and is used to boost optical power across the C-band. The gain spectrum generated by the EDFA has asymmetrical twin peaks due to a luminescent spectrum resulting from fine structure of the energy levels. Also, the wavelength-dependent gain characteristics of the EDFA depends on the power characteristics of pumping lasers, the concentration of erbium ion in fibers, the kind and volume of co-doped ions, the length of fibers, etc . . . In addition, the wavelength-dependent gain characteristics of the EDFA are also dependent on the characteristics of the optical elements and network configurations. These factors collectively lead to a non-uniform gain spectrum or profile giving rise to an uneven power distribution of a multi-channel signal after amplification. The gain difference between the peak and bottom of the signal after amplification is in the order of magnitude of 10–20 dB. Therefor, a passive gain flattening filter is needed to statically equalize the power levels of the amplified multi-channel signal.

Figure 2:
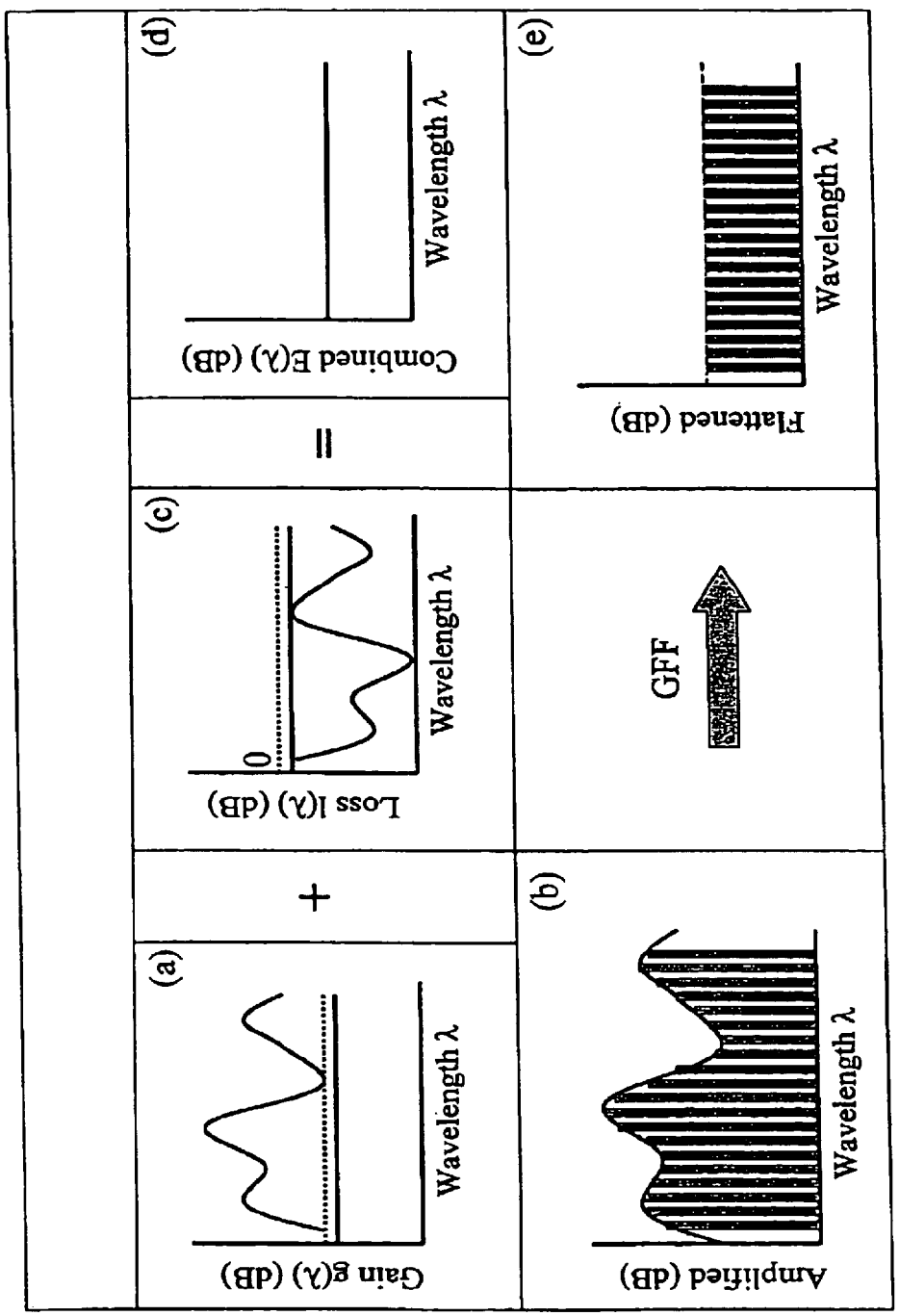
FIG. 2 illustrates the operation of a gain-flattening filter.

The operation of a gain flattening filter is illustrated in FIG. 2. A non-uniform gain profile determined by the factors mentioned above for an EDFA is shown in FIG. 2(a). An incident optical signal containing a plurality of wavelengths, whose channels have equal power levels, is amplified with the EDFA. The resulting power distribution for the gain profile of FIG. 2(a) is illustrated in FIG. 2(b). The purpose of a gain flattening filter is to use a spectral filter whose spectrum counteracts the gain profile of the amplifier. Mathematically, a transmission function $L(\lambda)$ whose loss spectrum versus wavelength approximates the inverse of the gain profile $G(\lambda)$ is found, so that:

$$G(\lambda) \times L(\lambda) = C \quad (1)$$

where C is a constant that determines the power level after flattening. Using a logarithmic scale and expressing the gain and loss in terms of dB, then equation (1) becomes:

$$g(\lambda) + l(\lambda) = c \quad (2)$$

where $g(\lambda) = 10 \times \log_{10}[G(\lambda)]$, $l(\lambda) = 10 \times \log_{10}[l(\lambda)]$, and $c = 10 \times \log_{10}[C]$. Accordingly, solving for the loss function in equation (2) determines:

$$l(\lambda) = c - g(\lambda) \quad (3)$$

which is schematically shown in FIG. 2(c). If c is the minimum value of $g(\lambda)$, the maximum value of $l(\lambda)$ is zero. This is an ideal case with the flattening target power level is held at c as shown by the dotted line 110 in FIG. 1. In practice, an offset Δ, also shown in FIG. 1, should be considered due to the presence of insertion loss and other dissipative mechanisms. The value Δ is therefore the insertion loss of the gain flattening filter. The function of the gain flattening filter (GFF) is to reduce or attenuate the extra power which is above a threshold or target level c-Δ indicated by the horizontal solid line 120 in FIG. 1. The threshold or target level may be c-Δ or any other desired level such as the lowest power level of all the wavelengths. Referring to FIG. 2, the combination of the gain profile $g(\lambda)$ in FIG. 2(a) with the loss spectrum $l(\lambda)$ in FIG. 2(c) results in an attenuated or flat gain spectrum $E(\lambda)$ in FIG. 2(d). The overall outcome of the optical amplifier followed by a gain flattening filter is the optical amplification with flat spectrum. The overall gain-flattened power distribution is illustrated in FIG. 2(e).

The present invention uses transmission volume phase gratings (VPGs) as the damping elements to produce the desired loss function $l(\lambda)$. It will be recognized that VPGs have been used to design compact dense wavelength division multiplexing devices. (See generally, U.S. Pat. Nos. 6,275,630 and 6,108,471, the contents of which are incorporated herein by reference). A thick VPG will have a high diffraction efficiency when the Bragg condition is satisfied. Furthermore, the diffraction spectrum of the VPG is adjustable by changing the characteristic parameters and diffraction geometry of the VPG. The characteristic parameters of the VPG include thickness, index modulation depth, and period of index modulation. The diffraction geometry is the angular orientation of the VPG relative to the position of adjacent VPGs. For example, the spectral width of the VPG can be controlled by the grating thickness, while the diffraction efficiency can be decreased as the index modulation is reduced. By changing the period of the index modulation, the diffraction will appear at the desired wavelength region. By adjusting the characteristic parameters of the VPG, it is possible to design a part of the loss function $l(\lambda)$ over a given wavelength range with a VPG.

Figure 3:
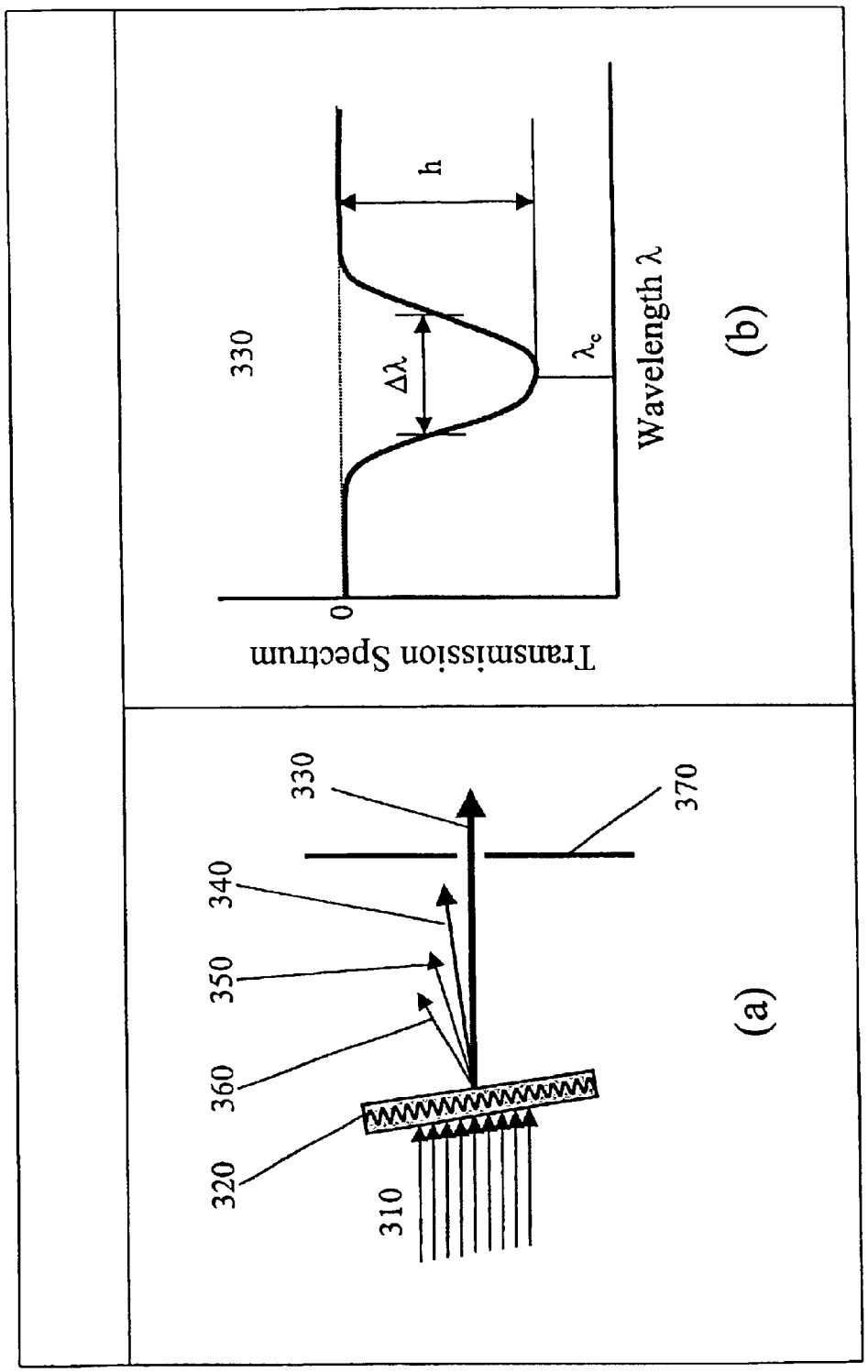
FIG. 3(a) illustrates the diffraction geometry of a volume phase grating (VPG)
FIG. 3(b) illustrates the diffraction spectrum of a VPG.

In the direct transmission spectrum (zero-order diffraction), there is a minimum at a corresponding wavelength window where first-, second-, third- and higher-order diffraction may occur. For a thick transmission VPG, only zero- and first-order diffraction exists and the other higher-order diffractions are suppressed at this minimum. Referring to FIG. 3(a), incident collimated light 310 is diffracted by a VPG 320. In the direction of incident light, the zero-order diffraction 330 exists, which contains all spectral components of the incidence light except the parts diffracted. Along with the zero-order diffraction beam, the first-order diffraction beam 340, the second-order diffraction beam 350, and other higher-order beams 360 might exist. An optical aperture 370 is placed to allow the zero-order beam 330 to pass and block all the other beams. The zero-order spectrum, referred to as the transmission spectrum of the VPG, does exhibit some loss over the wavelength regions. A loss transmission spectrum is shown in FIG. 3(b) in which h represents the loss depth and $\Delta\lambda_c$ corresponds to the spectral width of the diffraction. The center Wavelength $\lambda_c$ is controllable by varying the characteristic parameters of the VPG.

In order to generate a desired loss spectrum function $l(\lambda)$, several VPGs are used to produce the desired loss function with its spectral characteristics over the desired given wavelength region. Superposition of all loss functions from each VPG approximates the global loss spectrum function $l(\lambda)$. The VPGs are cascaded so that the transmission spectrum from the last VPG is the superposition of all transmission spectrum functions obtained from the VPGs.

Figure 4:
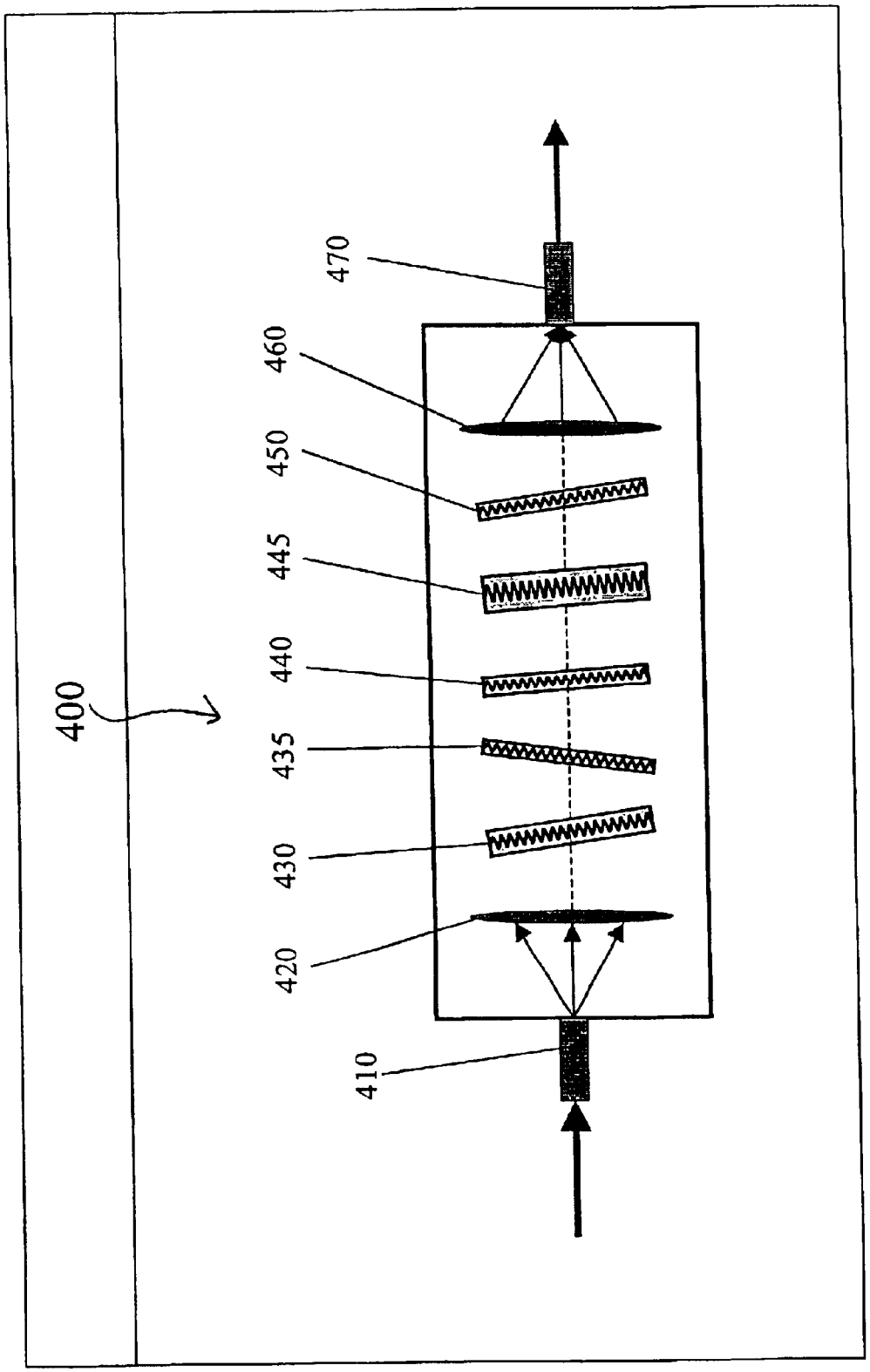
FIG. 4 illustrates an optical gain flattening filter using VPG based optical elements and constructed in accordance with the present invention.

Referring to FIG. 4, a diagram of a gain flattening filter 400 using VPGs is shown. The device 400 comprises an input port 410, a first collimating lens 420, five VPGs 430, 435, 440, 445, 450, a second focusing lens 460, and an output port 470. A light beam from the input port 410 is collected by the lens 420 that focuses the beam incident upon a first VPG 430. The first VPG 430 has grating characteristics and orientation chosen such that a desired loss function $l_1(\lambda)$ is formed. The zero-order diffraction beam from the first VPG 430 is then incident upon a second VPG 435. The second VPG 435 has grating characteristics and orientation chosen such that a desired loss function $l_2(\lambda)$ is produced. Similarly, the zero-order diffraction beam from the second VPG 435 is then incident upon a third VPG 440 which is designed with a third loss function $l_3(\lambda)$. The zero-order diffraction beam is incident on a fourth VPG 445 with a fourth loss function $l_4(\lambda)$ and a fifth VPG 450 with a fifth loss function $l_5(\lambda)$. The transmitted beam after the fifth VPG 450 is the power-flattened signal. The focusing lens 460 focuses the signal from the fifth VPG 450 and directs the beam to the output port 470. It will be recognized that the VPGs 430–450 may be connected using fixed or adjustable spacers. The overall loss function for the gain flattening filter 400 is:

$$l(\lambda) = l_1(\lambda) + l_2(\lambda) + l_3(\lambda) + l_4(\lambda) + l_5(\lambda) = \sum_{k=1}^{5} 10 \times \log_{10} L_k(\lambda) \quad (4)$$

By using adjustable spacers, it is possible to finely tune the loss spectrum such that the gain flattening filter 400 can be applied to optical amplifiers with slightly different gain spectrum profiles. The spacers would allow the orientation between the VPGs 430–450 to be adjusted to achieve the desired loss function.

It is worth noting that focusing lenses are not needed between the VPGs because only the zero-order diffraction beam is used to constitute the target transmission spectrum. The zero-order diffraction beam is the directly transmitted beam that propagates in the forward direction. By contract, all the nonzero-order diffraction beams have deviation angles with respect to the incident direction such that these beams would not be directed to the output port 470.

Figure 5:
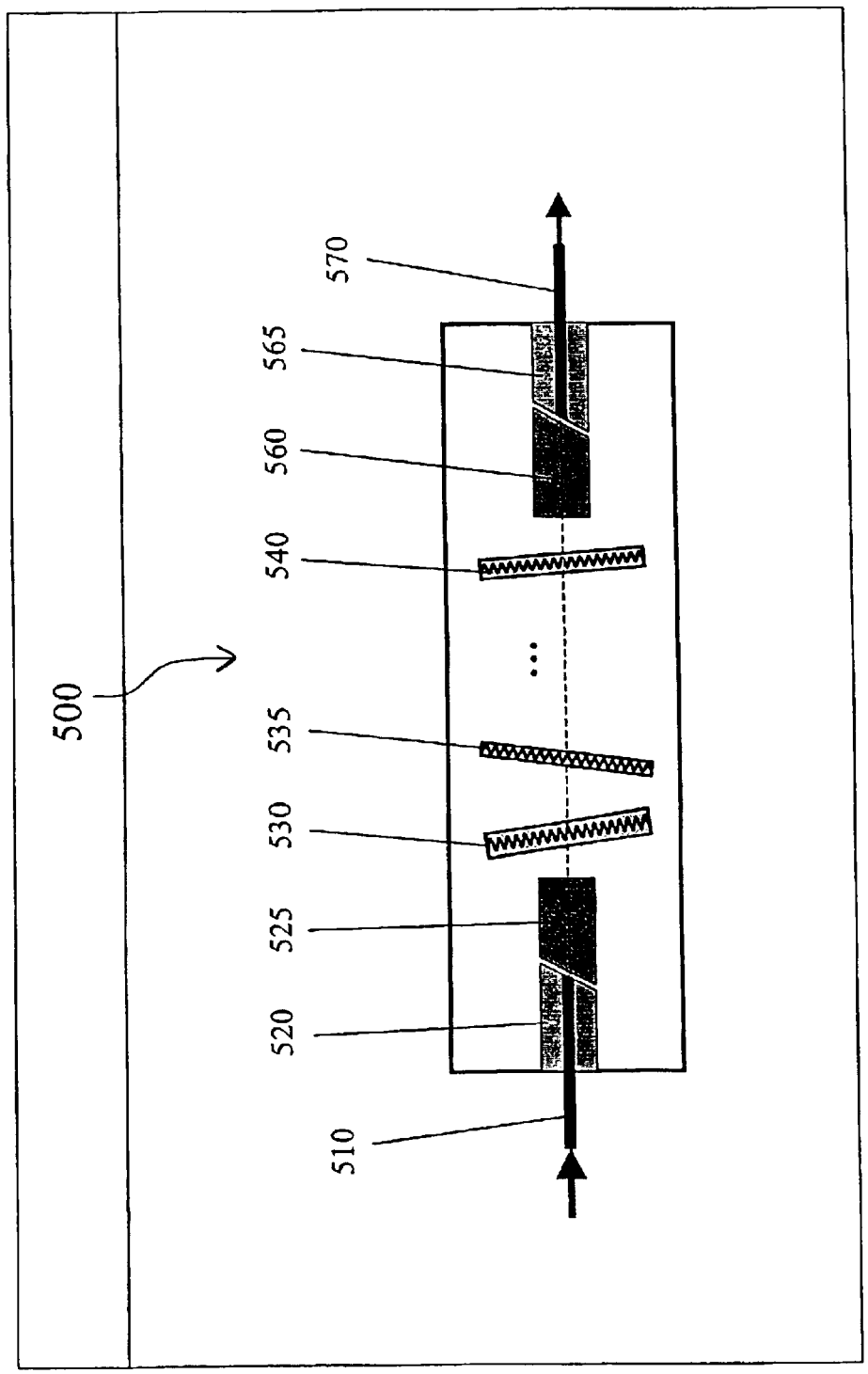
FIG. 5 illustrates the filter shown in FIG. 4 using VPGs and GRIN-lenses.

It is also possible to replace the two lenses 420 and 460 shown in FIG. 4 with a pair of GRIN-lenses. More specifically, referring to FIG. 5, a gain flattening filter 500 may have an input port with an input fiber 510, a single-fiber capillary 520, and a GRIN-lens 525 with a preferred pitch of 0.25. The rear facet of the single-fiber capillary 520 and the front facet of the GRIN-lens 525 may have an angle of 8° to reduce back-reflection. The 0.25 pitch GRIN-lens collimates the light beam from the input fiber 510 onto a VPG 530. The device 500 has multiple VPGs 530, 535 and 540 configured and arranged in the same manner as the device 400 described in FIG. 4. The collimated beam from the GRIN-lens 525 passes through the series of transmission volume phase gratings 530, 535, 540. The forward-traveling zero-order diffraction beam is then incident upon the GRIN-lens 560 and focused onto the output fiber 570. The output port may have a similar structure as the input unit, but in reverse. Specifically, the output port will have the GRIN-lens 560, the single-fiber capillary 565, and an output fiber 570. It will be recognized that other types of input-output units such as C-lenses can also be used to focus the zero-order diffraction beam.

Figure 6:
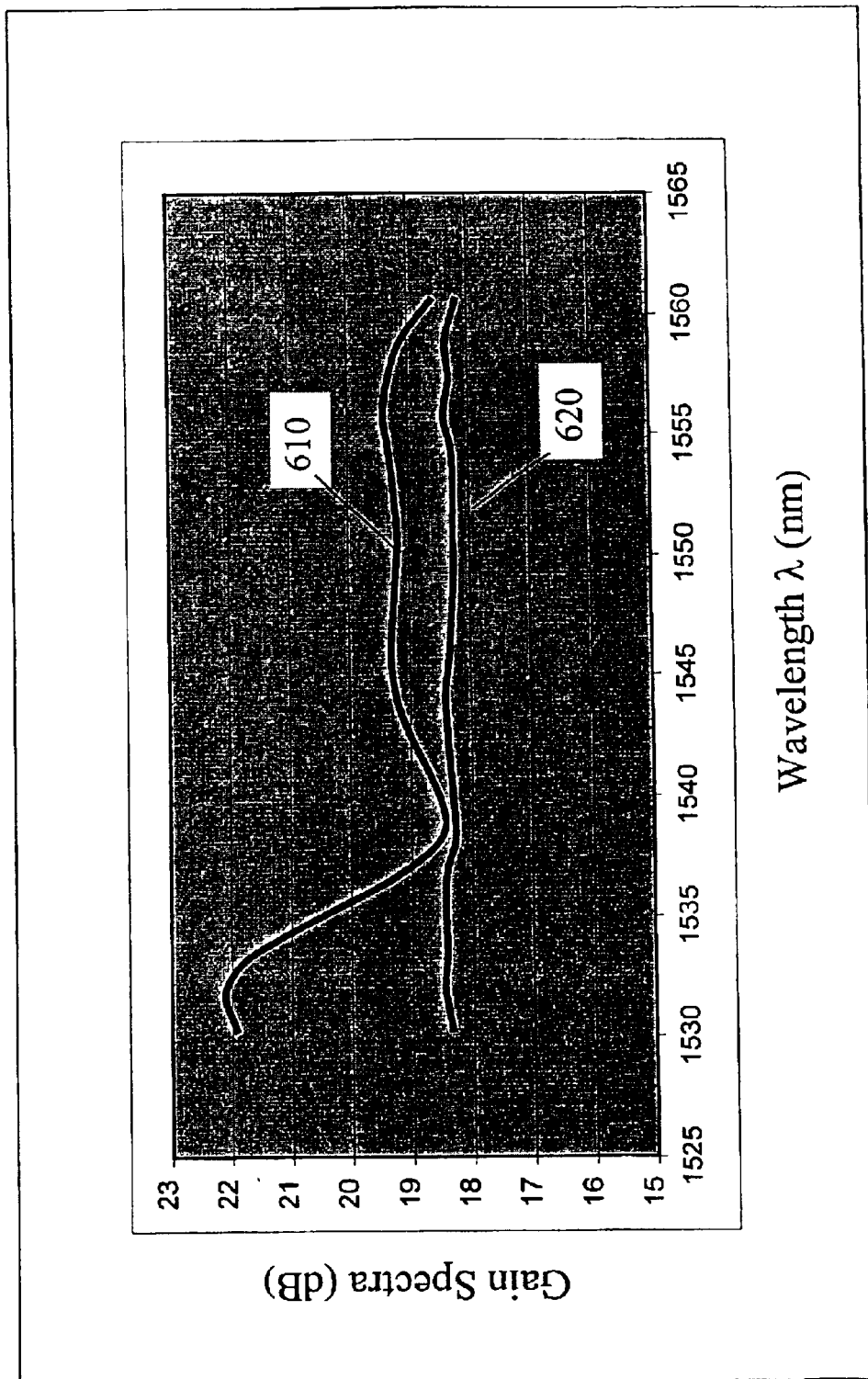
FIG. 6 shows an uneven gain spectrum due to an EDFA and a flattened spectrum processed by the gain flattening filter of the present invention.

Referring to FIG. 6, the power distributions of a multi-channel signal amplified by an EDFA before and after using the gain flattening filter of the present invention is shown. The input signal contains 40 channels in the C-band with a channel spacing of 100 GHz. In the signal before using the GFF, a power difference between the maximum and minimum values is around 3.5 dB, as shown in the upper trace 610. After gain flattening with the GFF, the power spectrum, as shown in the lower trace 620, is substantially flattened with power uniformity within 0.3 dB.

Accordingly, the present invention provides a precise transmission spectrum function (loss spectrum) for counteracting the gain spectrum of optical amplifiers in terms of the notch diffraction spectra of optical gratings. The gain flattening filters of the present invention use transmission volume phase gratings that have different grating characteristics and are positioned in space according to the target loss spectrum.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. An optical gain flattening filter for adjusting a gain spectrum of an optical amplifier, the filter comprising:
   an input port for receiving the optical beam;
   at least three volume phase gratings in optical communication with the input port, each of the volume phase gratings having a particular loss spectrum and operative to add the loss spectrum to the gain spectrum of the optical amplifier; and
   an output port in optical communication with the volume phase gratings, the output port configured to output the optical beam from the volume phase gratings;
   wherein the sum of the loss spectrums of the volume phase gratings is about equal to the opposite of the gain spectrum of the optical amplifier such that the gain spectrum of the optical amplifier is flattened.

2. The filter of claim 1 wherein the gain spectrum of the optical amplifier is the power of the optical amplifier for each wavelength above a threshold value.

3. The filter of claim 2 wherein the volume phase gratings attenuate the gain spectrum of the optical beam to the threshold value.

4. The filter of claim 3 wherein the threshold value is the lowest power of the wavelengths of the optical beam.

5. The filter of claim 1 wherein an orientation of the volume phase gratings is adjusted so that the sum of the loss spectrums of the volume phase gratings is about equal to the opposite of the power spectrum of the optical beam.

6. The filter of claim 5 wherein the angular orientation of the volume phase gratings is adjusted.

7. The filter of claim 1 wherein the source of the optical beam is an erbium-doped fiber amplifier and the volume phase gratings are configured to attenuate the gain spectrum of the optical beam generated by the erbium-doped fiber amplifier.

8. The filter of claim 1 wherein there are at least three volume phase gratings in order to adjust the sum of the loss spectrum.

9. The filter of claim 1 wherein the volume phase gratings are configured to add the sum of the loss spectrums to the gain spectrum of the amplifier beam.

10. A method of flattening the gain spectrum of an optical amplifier with an optical gain flattening filter having at least three volume phase gratings wherein each of the volume phase gratings has a loss spectrum, the method comprising the steps of:
    receiving an optical beam with the volume phase gratings;
    attenuating the gain spectrum of the optical beam by the sum of the loss spectrums for the volume phase gratings; and
    outputting the attenuated optical beam from the volume phase gratings.

11. The method of claim 10 where the step of attenuating the gain spectrum comprises attenuating the gain spectrum of the optical beam to a threshold value.

12. The method of claim 11 wherein the threshold value is the lowest power of the wavelengths of the optical beam.

13. The method of claim 10 wherein the optical gain filter has an input port and an output port, and the method further comprises receiving the optical beam with the input port and outputting the attenuated optical beam at the output port.

14. The method of claim 10 wherein the step of attenuating the gain spectrum comprises:
    summing the loss spectrum of the volume phase gratings such that the sum of the loss functions is about equal to the opposite of the gain spectrum for the optical beam; and
    adding the sum of the loss spectrums of the volume phase gratings to the power spectrum of the optical beam in order to attenuate the power of the optical beam.

15. The method of claim 10 further comprising the initial step of selecting the volume phase gratings such that the sum of the loss spectrums of the volume phase gratings is approximately equal to the opposite of the power spectrums of the optical beam.

16. The method of claim 15 wherein three volume phase gratings are selected.

17. The method of claim 10 wherein the step of attenuating the gain spectrum further comprises adjusting the orientation of the volume phase gratings such that the sum of the loss spectrums of the volume phase gratings is approximately equal to the opposite of the power spectrum of the optical beam.

18. The method of claim 17 wherein the angular orientation of the volume phase gratings is adjusted.

19. The method of claim 17 wherein the distance between the volume phase gratings is adjusted.

20. The method of claim 6 wherein the optical beam is generated by an erbium-doped fiber amplifier and the step of attenuating the gain spectrum comprises summing the loss spectrums of the volume phase gratings such that the sum of the loss spectra is approximately equal to the opposite of the power spectrum for the optical beam from the erbium-doped fiber amplifier.

21. An optical gain flattening filter for attenuating the gain spectrum of an optical amplifier, the filter comprising: input means for receiving an optical beam;
    compensating means in optical communication with the input means and for attenuating the gain spectrum of the optical beam, the compensating means having at least two volume phase gratings; and
    output means in optical communication with the compensating means, the output means for outputting the attenuated optical beam.

22. The filter of claim 21 wherein the input means is an input port.

23. The filter of claim 21 wherein the output means is an output port.

24. The filter of claim 21 wherein the compensating means comprises a series of volume phase gratings in optical communication with the input means and the output means, the volume phase gratings being configured to attenuate the gain spectrum of the optical beam passed therethrough.

25. The filter of claim 24 wherein each of the volume phase gratings has a loss spectrum and the sum of the loss spectrums of the volume phase gratings is about equal to the opposite of the gain profile of the optical beam.

26. The filter of claim 25 wherein the volume phase gratings are configured to add the sum of the loss spectrums to the power spectrum of the optical beam in order to attenuate the gain spectrum of the optical amplifier.

27. The filter of claim 25 wherein the orientation of the volume phase gratings are adjusted such that the sum of the loss spectrums of the volume phase gratings is about equal to the opposite of the power spectrum of the optical beam.

28. The filter of claim 21 wherein the compensating means attenuates the power spectrum of the optical beam to a threshold value.

29. The filter of claim 28 wherein the threshold value is the lowest power level of the wavelengths for the optical beam.

30. An optical gain flattening filter for attenuating a gain spectrum of an optical amplifier, the filter comprising: an input port for receiving an optical beam;
- a first lens in optical communication with the input port, the first lens being configured to focus the optical beam;
- three volume phase gratings each having a loss spectrum and in optical communication with the first lens, the volume phase gratings being configured to attenuate the gain spectrum of the optical amplifier in relation to the sum of the loss spectrums of each of the volume phase gratings;
- a second lens in optical communication with the volume phase gratings, the second lens being configured to focus the attenuated optical beam from the volume phase gratings; and
- an output port in optical communication with the second lens, the output port being configured to receive the optical beam focused from the second lens.

31. The filter of claim 30 wherein the input port and the output port are optical fibers.

32. The filter of claim 30 wherein the first and second lenses are GRIN lenses.

33. The filter of claim 30 wherein the power spectrum of the optical beam is the power level of the wavelengths of the optical beam above a threshold value.

34. The filter of claim 33 wherein the threshold value is the lowest power level of the wavelengths of the optical beam.

35. The filter of claim 33 wherein the threshold value is the lowest power level of the wavelengths of the optical beam plus insertion losses.

* * * * *